United States Patent
Lochel, Jr. et al.

(10) Patent No.: US 12,435,251 B2
(45) Date of Patent: *Oct. 7, 2025

(54) BIO-BASED BINDER SYSTEMS

(71) Applicant: CARGILL, INCORPORATED, Wayzata, MN (US)

(72) Inventors: Frank P. Lochel, Jr., Delano, MN (US); John Carl Tolfa, Midland, MI (US)

(73) Assignee: CARGILL, INCORPORATED, Wayzata, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,606

(22) Filed: Oct. 16, 2023

(65) Prior Publication Data
US 2024/0034917 A1    Feb. 1, 2024

Related U.S. Application Data

(63) Continuation of application No. 16/740,901, filed on Jan. 13, 2020, now Pat. No. 11,814,549, which is a
(Continued)

(51) Int. Cl.
*C09J 103/02* (2006.01)
*C03C 25/321* (2018.01)
(Continued)

(52) U.S. Cl.
CPC .......... *C09J 103/02* (2013.01); *C03C 25/321* (2013.01); *C08K 5/0025* (2013.01); *C08L 3/02* (2013.01);
(Continued)

(58) Field of Classification Search
None
See application file for complete search history.

(56) References Cited

U.S. PATENT DOCUMENTS

| | | |
|---|---|---|
| 1,790,464 A | 1/1931 | Bois |
| 1,790,494 A | 1/1931 | Adams et al. |

(Continued)

FOREIGN PATENT DOCUMENTS

| | | |
|---|---|---|
| CA | 2315955 A1 | 2/2002 |
| EP | 2093266 A1 | 8/2009 |

(Continued)

OTHER PUBLICATIONS

A. L. Potter, et al., "Starch. II. Molecular Weights of Amyloses and Amylopectins from Starches of Various Plant Origins", J. Am. Chem. Soc., 1948, 70 (11), pp. 3774-3777 DOI: 10.1021/ja01191a069, Nov. 1948.

(Continued)

*Primary Examiner* — Michael Forrest

(57) ABSTRACT

An environmentally friendly, bio-based binder system that is useful for the formation of fiberglass insulation, the system includes: A) an aqueous curable binder composition, which includes a carbohydrate and a crosslinking agent; and B) a dedust composition, which includes a blown, stripped plant-based oil and optionally at least one emulsifying agent. The bio-based binder system is typically heated to form a cured binder system.

17 Claims, 2 Drawing Sheets

Related U.S. Application Data continuation of application No. 16/018,607, filed on Jun. 26, 2018, now Pat. No. 10,550,294, which is a continuation of application No. 15/288,334, filed on Oct. 7, 2016, now Pat. No. 10,030,177, which is a continuation of application No. 14/122,329, filed as application No. PCT/US2012/038850 on May 21, 2012, now abandoned.

(60) Provisional application No. 61/490,695, filed on May 27, 2011.

(51) Int. Cl.
| | |
|---|---|
| *C08K 5/00* | (2006.01) |
| *C08K 5/092* | (2006.01) |
| *C08K 5/103* | (2006.01) |
| *C08K 9/04* | (2006.01) |
| *C08L 3/02* | (2006.01) |
| *C08L 91/00* | (2006.01) |
| *C09J 103/04* | (2006.01) |
| *C09J 105/06* | (2006.01) |
| *C09J 191/00* | (2006.01) |
| *D04H 1/64* | (2012.01) |
| *D04H 3/004* | (2012.01) |
| *D04H 3/12* | (2006.01) |
| *E04B 1/76* | (2006.01) |

(52) U.S. Cl.
CPC ............ *C08L 91/00* (2013.01); *C09J 103/04* (2013.01); *C09J 105/06* (2013.01); *C09J 191/00* (2013.01); *D04H 1/64* (2013.01); *D04H 3/004* (2013.01); *D04H 3/12* (2013.01); *E04B 1/7662* (2013.01); *C08K 5/092* (2013.01); *C08K 5/103* (2013.01); *C08K 9/04* (2013.01)

(56) References Cited

U.S. PATENT DOCUMENTS

| | | | |
|---|---|---|---|
| 2,056,656 A | 10/1936 | Carleton | |
| 2,396,129 A | 3/1946 | Rodman et al. | |
| 2,569,124 A | 9/1951 | Harpt et al. | |
| 2,657,224 A | 10/1953 | Bierke et al. | |
| 2,750,298 A | 6/1956 | Kiebler et al. | |
| 3,759,854 A | 9/1973 | Chang et al. | |
| 4,054,713 A | 10/1977 | Furukawa et al. | |
| 4,330,625 A | 5/1982 | Miller et al. | |
| 4,552,775 A | 11/1985 | Baeling et al. | |
| 4,589,990 A | 5/1986 | Zehler et al. | |
| 4,650,598 A | 3/1987 | Roberts et al. | |
| 5,162,394 A | 11/1992 | Trocino et al. | |
| 5,321,064 A | 6/1994 | Vaidya et al. | |
| 5,446,078 A | 8/1995 | Vaidya et al. | |
| 5,480,963 A | 1/1996 | Jiang et al. | |
| 5,512,313 A | 4/1996 | Harris et al. | |
| 5,523,264 A | 6/1996 | Mattson | |
| 5,532,392 A | 7/1996 | Gheorghiu et al. | |
| 5,595,782 A * | 1/1997 | Cole | C09K 3/22 |
| | | | 252/88.1 |
| 5,714,264 A | 2/1998 | Woltering et al. | |
| 5,895,804 A | 4/1999 | Pauls et al. | |
| 6,312,826 B1 | 11/2001 | Shogren et al. | |
| 6,443,661 B1 | 9/2002 | Wathen et al. | |
| 6,476,244 B2 | 11/2002 | Mahlum et al. | |
| 6,589,442 B1 | 7/2003 | Wilson et al. | |
| 6,759,542 B2 | 7/2004 | Mahlum et al. | |
| 6,822,105 B1 | 11/2004 | Luxem et al. | |
| 7,026,390 B2 | 4/2006 | O'Brien-Bernini et al. | |
| 7,141,626 B2 | 11/2006 | Foster et al. | |
| 7,262,311 B2 | 8/2007 | Christianson et al. | |
| 7,601,858 B2 | 10/2009 | Winsness et al. | |
| 7,608,729 B2 | 10/2009 | Winsness et al. | |
| 7,842,746 B2 | 11/2010 | Bloom et al. | |
| 7,893,154 B2 | 2/2011 | Van et al. | |
| 7,989,647 B2 | 8/2011 | Geiger et al. | |
| 8,008,516 B2 | 8/2011 | Winsness et al. | |
| 8,580,988 B2 | 11/2013 | Murphy et al. | |
| 8,765,985 B2 | 7/2014 | Lochel et al. | |
| 8,779,172 B2 | 7/2014 | Lochel et al. | |
| 8,864,893 B2 | 10/2014 | Hawkins et al. | |
| 8,890,807 B2 | 11/2014 | Lee et al. | |
| 8,895,766 B2 | 11/2014 | Murphy et al. | |
| 8,980,807 B2 | 3/2015 | Hora et al. | |
| 9,181,513 B2 | 11/2015 | Murphy et al. | |
| 9,243,208 B2 | 1/2016 | Lochel et al. | |
| 9,243,209 B2 | 1/2016 | Lochel et al. | |
| 9,556,398 B2 | 1/2017 | Hora et al. | |
| 9,580,988 B2 | 2/2017 | Bleck et al. | |
| 9,725,674 B2 | 8/2017 | Hora et al. | |
| 9,765,280 B2 | 9/2017 | Kurth et al. | |
| 9,963,658 B2 | 5/2018 | Lochel | |
| 10,030,177 B2 | 7/2018 | Lochel et al. | |
| 10,144,902 B2 | 12/2018 | Hora et al. | |
| 2003/0008978 A1* | 1/2003 | Chen | C08K 5/053 |
| | | | 525/379 |
| 2003/0181602 A1 | 9/2003 | Ansmann et al. | |
| 2004/0087808 A1 | 5/2004 | Prevost et al. | |
| 2005/0131092 A1 | 6/2005 | Kurth et al. | |
| 2005/0215153 A1 | 9/2005 | Cossement et al. | |
| 2006/0107859 A1 | 5/2006 | Sampei et al. | |
| 2006/0252655 A1 | 11/2006 | Iso et al. | |
| 2006/0252855 A1 | 11/2006 | Pisanova et al. | |
| 2007/0004811 A1 | 1/2007 | Bruner et al. | |
| 2007/0027283 A1 | 2/2007 | Swift et al. | |
| 2007/0089356 A1 | 4/2007 | Krasutsky et al. | |
| 2007/0260080 A1 | 11/2007 | Lee et al. | |
| 2008/0138526 A1 | 6/2008 | Tutin et al. | |
| 2008/0190567 A1 | 8/2008 | Winsness et al. | |
| 2008/0281285 A1 | 11/2008 | Noda et al. | |
| 2008/0299632 A1 | 12/2008 | Winsness et al. | |
| 2009/0068416 A1 | 3/2009 | Noda et al. | |
| 2009/0076913 A1 | 3/2009 | Morgan et al. | |
| 2009/0123609 A1 | 5/2009 | Harris et al. | |
| 2009/0223620 A1* | 9/2009 | Kurth | D06N 7/0071 |
| | | | 156/72 |
| 2009/0250183 A1 | 10/2009 | Hayes et al. | |
| 2009/0287007 A1 | 11/2009 | Abraham et al. | |
| 2010/0034586 A1 | 2/2010 | Bailey et al. | |
| 2010/0036177 A1 | 2/2010 | Ward et al. | |
| 2010/0048813 A1 | 2/2010 | Clauss et al. | |
| 2010/0063166 A1 | 3/2010 | Behler et al. | |
| 2010/0139899 A1 | 6/2010 | Suzuki et al. | |
| 2010/0282996 A1 | 11/2010 | Jaffrennou et al. | |
| 2010/0301256 A1 | 12/2010 | Hampson et al. | |
| 2010/0305271 A1 | 12/2010 | Mentink et al. | |
| 2011/0008656 A1 | 1/2011 | Tanahashi et al. | |
| 2011/0021101 A1 | 1/2011 | Hawkins et al. | |
| 2011/0054098 A1* | 3/2011 | Tutin | D04H 3/004 |
| | | | 524/300 |
| 2011/0060095 A1 | 3/2011 | Tutin et al. | |
| 2011/0086567 A1 | 4/2011 | Hawkins et al. | |
| 2011/0165398 A1 | 7/2011 | Shoemake et al. | |
| 2012/0065414 A1 | 3/2012 | Lochel et al. | |
| 2012/0065417 A1 | 3/2012 | Hora et al. | |
| 2012/0122758 A1 | 5/2012 | Andjelic et al. | |
| 2013/0065803 A1 | 3/2013 | Hora et al. | |
| 2014/0038485 A1 | 2/2014 | Anderson et al. | |
| 2014/0051824 A1 | 2/2014 | Anderson et al. | |
| 2014/0083328 A1 | 3/2014 | Lochel et al. | |
| 2015/0152350 A1 | 6/2015 | Hora et al. | |

FOREIGN PATENT DOCUMENTS

| | | | | |
|---|---|---|---|---|
| GB | 1293744 | A | 10/1972 | |
| GB | 2279079 | A * | 12/1994 | ............... C09K 3/22 |
| GB | 2462371 | A | 2/2010 | |
| JP | 2014-000011 | A | 1/2014 | |
| WO | 8604603 | A1 | 8/1986 | |
| WO | 9939039 | A1 | 8/1999 | |
| WO | 0162880 | A1 | 8/2001 | |

(56) References Cited

FOREIGN PATENT DOCUMENTS

| WO | 2007088421 A2 | 8/2007 |
| WO | 2007098928 A1 | 9/2007 |
| WO | 2009034549 A2 | 3/2009 |
| WO | 2009046521 A1 | 4/2009 |
| WO | 2009080938 A2 | 7/2009 |
| WO | 2009095617 A2 | 8/2009 |
| WO | 2010135630 A1 | 11/2010 |
| WO | 2010135637 A1 | 11/2010 |
| WO | 2010137122 A1 | 12/2010 |
| WO | 2011002730 A1 | 1/2011 |
| WO | 2011046856 A2 | 4/2011 |
| WO | 2011/146856 A1 | 11/2011 |
| WO | 2011146848 A1 | 11/2011 |
| WO | 2012138718 A1 | 10/2012 |
| WO | 2012138723 A1 | 10/2012 |
| WO | 2012166406 A1 | 12/2012 |
| WO | 2012166414 A1 | 12/2012 |
| WO | 2012166842 A1 | 12/2012 |

OTHER PUBLICATIONS

D. Pramanick, et al., "Synthesis and biodegradation of copolyesters from citric acid and glycerol", Polymer Bulletin, vol. 19, Issue 4, Apr. 1988, 365-370.

Jan Trenkelamoroso, et al., "Synthesis, Degradation and Practical Applications of a Glycerol/Citric Acid Condensation Polymer", A Thesis submitted to Oregon State University, presented Dec. 9, 2008, 66 pages.

Lower, Edgar S., et al., "Blown (air oxidised) vegetable & marine oils & paint manufacture", Pigment and Resin Technology, May 1967, 7-10.

Michel M. Brioude, et al., "Synthesis and characterization of aliphatic polyesters from glycerol, by-product of biodiesel production, and adipic acid", Materials Research 10(4) 10(4) • Oct. 2007, 335-339.

Nagata, et al., "Synthesis and enzymatic degradation of regular network aliphatic polyesters", Reactive & Functional Polymers, 30 (), 1996, 165-171.

Pachauri, et al., "Value-added Utilization of Crude Glycerol from Biodiesel Production: A Survey of Current Research Activities", An ASABE Meeting Presentation, Portland, Oregon, , Paper No. 066223, Jul. 9-12, 2006.

Reddy, et al., "Citric acid cross-linking of starch films", Food Chemistry 118(3):702-711 • Feb. 2010.

Reddy, et al., "Wet Cross-Linking Gliadin Fibers with Citric Acid and a Quantitative Relationship between Cross-Linking Conditions and Mechanical Properties", J. Agric. Food Chem., vol. 57, No. 1, 2009, pp. 90-98.

Ronald Alan Holser, et al., "Thermal Analysis of Glycerol Citrate/Starch Blends", Applied Polymer Science, vol. 110, Issue3, Nov. 5, 2008, 1498-1501.

Shi, et al., "Characterization of citric acid/glycerol co-plasticized thermoplastic starch prepared by melt blending", Carbohydrate Polymers, vol. 69 (4) —Jul. 2, 2007, 8 Pages.

Sievers, A. F., et al., "The Preperation of an edible oil from crude corn oil", USDA, Bulletin No. 1010, 1922, 1-25.

Singh, N., et al., "Extraction of Oil from Corn Distillers Dried Grains with Solubles", Transactions of the ASAE, American Society of Agricultural Engineers, vol. 41, 1998, 1775-1777.

Ünal, "Synthesis and Characterization of Branched Macromolecules for High Performance Elastomers, Fibers, and Films", Dissertation submitted to the Virginia Polytechnic Institute and State University, Nov. 16, 2005, 240 pages.

Voit, et al., "Hyperbranched and Highly Branched Polymer Architectures—Synthetic Strategies and Major Characterization Aspects", Chem. Rev., 2009, 5924-5973.

Welch, et al., "Curing Agents Having Low or Zero Phosphorus Content for Formaldehyde Free DP Finishing with Polycarboxylic Acids", Textile Chemist and Colorist Journal, vol. 25, No. 10, Oct. 1993, pp. 25-29.

Welch, "Formaldehyde-Free Durable Press Finishing,", Surfactant Science Series, vol. 94, 2001, pp. 1-32.

\* cited by examiner

BIO-BASED BINDER SYSTEMS

CROSS REFERENCE TO RELATED APPLICATION

This application is a Continuation of U.S. application Ser. No. 16/740,901, filed Jan. 13, 2020, which is a Continuation of U.S. Pat. No. 10,550,294, issued Feb. 4, 2020, which is a Continuation of U.S. Pat. No. 10,030,177, issued Jul. 24, 2019, which is a Continuation of U.S. application Ser. No. 14/122,329, Nov. 26, 2013, which is a national phase of PCT Application No. PCT/US2012/038850, filed May 21, 2012, which claims the benefit of the U.S. Provisional Application No. 61/490,695, filed May 27, 2011, each of which is incorporated by reference herein in its entirety.

TECHNICAL FIELD AND INDUSTRIAL APPLICABILITY OF THE INVENTION

The present invention relates generally to rotary fiber insulation and more particularly, to a bio-based binder system for use in manufacturing mineral fiber insulation (such as fiberglass insulation and stone wool insulation) that preferably contain no added formaldehyde, and are environmentally friendly.

BACKGROUND OF THE INVENTION

Conventional fibers are useful in a variety of applications including reinforcements, textiles, and acoustical and thermal insulation materials. Although mineral fibers (e.g., glass fibers and fibers made from stone) are typically used in insulation products, depending on the particular application, organic fibers such as polypropylene, polyester, and multicomponent fibers may be used alone or in combination with mineral fibers in forming the insulation product.

Fibrous insulation is typically manufactured by fiberizing a molten composition of polymer, glass, or other mineral (e.g. stone) and spinning fine fibers from a fiberizing apparatus, such as a rotating spinner. To form an insulation product, fibers produced by the rotating spinner are drawn downwardly from the spinner towards a conveyor by a blower. As the fibers move downward, a binder material is sprayed onto the fibers and the fibers are collected into a high loft, continuous blanket on the conveyor. The binder material gives the insulation product resiliency for recovery after packaging and provides stiffness and handleability so that the insulation product can be handled and applied as needed in the insulation cavities of buildings. The binder material also provides protection to the fibers from inter-filament abrasion and promotes compatibility between the individual fibers.

During the formation of fiberglass insulation (or stone wool insulation), dust can be liberated by the process. A dedust fluid is often applied to the glass fibers during the process to reduce this dust. Mineral-oil based fluids are often utilized as dedust fluids.

The blanket containing the binder-coated fibers is passed through a curing oven and the binder is cured to set the blanket to a desired thickness. After the binder has cured, the fiber insulation may be cut into lengths to form individual insulation products, and the insulation products may be packaged for shipping to customer locations. One typical insulation product produced is an insulation batt or blanket, which is suitable for use as wall insulation in residential dwellings or as insulation in the attic and floor insulation cavities in buildings.

Formaldehyde-based resins have often been utilized as binding material for fiberglass insulation (and stone wool insulation). However, recently attempts have been made to reduce undesirable formaldehyde emissions from formaldehyde-based resins. For example, various formaldehyde scavengers such as ammonia and urea have been added to the formaldehyde-based resin in an attempt to reduce formaldehyde emission from the insulation product. Because of its low cost, urea is added directly to the uncured resin system to act as a formaldehyde scavenger. The addition of urea to the resin system produces urea-extended phenol-formaldehyde resole resins. These resole resins can be further treated or applied as a coating or binder and then cured. Unfortunately, the urea-extended resoles are unstable, and because of this instability, the urea-extended resoles must be prepared on site. In addition, the binder inventory must be carefully monitored to avoid processing problems caused by undesired crystalline precipitates of dimer species that may form during storage. Ammonia is not a particularly desirable alternative to urea as a formaldehyde scavenger because ammonia generates an unpleasant odor and may cause throat and nose irritation to workers. Further, the use of a formaldehyde scavenger in general is undesirable due to its potential adverse affects to the properties of the insulation product, such as lower recovery and lower stiffness.

SUMMARY OF THE INVENTION

The inventors have surprisingly discovered that a bio-based binder system comprising a aqueous curable binder composition together with a dedust composition comprising a blown, stripped plant-based oil, wherein the total sulfur content of the system is minimized will result in a cured binder system that exhibits lower odor than a comparable binder system that has greater than 30 ppm sulfur, preferably a comparable binder system that has greater than 20 ppm sulfur (for example, greater than 15 ppm sulfur). This will provide for the manufacture of fibrous insulation product exhibiting an excellent low odor profile. This is surprising, since the sulfur content in typical binder systems utilizing formaldehyde-based binders with petroleum-based dedust oils or with plant-based dedust oils seems to have little effect on the odor properties of fibrous insulation products (e.g. fibreglass insulation and stone wool insulation) made with such formaldehyde-based binder systems.

In a first embodiment, the present invention provides a bio-based binder system useful for the formation of rotary fiber insulation (for example fiberglass insulation), the system comprising:
 A) an aqueous curable binder composition comprising:
  (i) at least one carbohydrate, for example maltodextrin, having a dextrose equivalent number from 2 to 20;
  (ii) at least one crosslinking agent, for example citric acid; and
 B) a dedust composition comprising:
  (i) a blown, stripped plant-based oil having a viscosity of at least 200 cSt at 40° C. (for example, at least 300 cSt at 40° C.), a flash point of at least 293° C., and having an acid value less than 5.0 mg KOH/gram,
wherein the bio-based binder system comprises 10 part per million sulfur or less based on the weight of components A) and B). excluding water.

In this first embodiment, the binder composition may also include a coupling agent, a moisture resistant agent, a catalyst, an inorganic acid or base, and/or an organic acid or base. In some preferred aspects, the binder system is free of added formaldehyde and is environmentally friendly. In exemplary embodiments, the crosslinking agent includes any monomeric or polymeric polycarboxylic acid and/or their corresponding salts.

In a second embodiment, the present invention provides a cured binder system resulting from heating the binder system of the first embodiment at a temperature and for a sufficient period of time sufficient to react the carbohydrate (i) with the crosslinking agent (ii) of the binder composition A). The binder may have a light color upon curing, is environmentally friendly, and is free of added formaldehyde.

In a third embodiment, the present invention provides a fibrous insulation product comprising:
A) a plurality of randomly oriented fibers; and
B) a cured binder system applied to at least a portion of said fibers, the cured binder system comprising:
  (i) a cured binder composition comprising a reaction product of at least one carbohydrate (for example a maltodextrin having a dextrose equivalent number from 2 to 20), and at least one crosslinking agent(for example citric acid); and
  (ii) the residue from a dedust composition comprising:
    (a) a blown, stripped plant-based oil having a viscosity of at least 200 cSt at 40° C. (for example, at least 250 cSt, at least 300 cSt, at least 350 cSt, at least 400 cSt, at least 450 cSt, or at least 500 cSt at 40° C.) and having an acid value less than 5.0 mg KOH/gram,
wherein the fibrous insulation product comprises less than 1 parts per million sulfur based on the weight of the fiberglass insulation product (for example less than 0.5 parts per million sulfur, less than 0.1 parts per million sulfur).

In a fourth embodiment, the present invention provides an insulation product formed by the process comprising: forming a plurality of randomly oriented glass fibers; applying a binder system of the first embodiment of the invention to the glass fibers to form a fibrous insulation blanket; and heating the fibrous insulation blanket to form an insulation product.

In some aspects of the invention, the dedust oil composition comprises a blown, stripped plant-based oil manufactured from oils, such as, soybean oil, canola oil, rapeseed oil, cottonseed oil, sunflower oil, palm oil, peanut oil, safflower oil, corn oil, safflower oil, corn stillage oil (as further described below), and mixtures thereof.

Typically, the blown, stripped plant-based oil has a flash point of at least 293° C., preferably at least 296° C., and more preferably at least 304° C., and in some instances at least 320° C. And, typically, the blown, stripped plant-based oil has a viscosity at 40° C. of at least 250 cSt (for example at least 300 cSt at 40° C., at least 350 cSt at 40° C.). and sometimes at least 400 cSt at 40° C., (for example at least 450 cSt at 40° C., at least 500 cSt at 40° C.).

The stripping of the plant-based oil during manufacture of the blown, stripped plant-based oil reduces the content of free fatty acids and other volatiles. During the stripping process, the oil is also bodied. Typically, the final blown, stripped plant-based oil has a higher viscosity than the initial viscosity of the blown oil before stripping. The stripping also removes lower molecular weight acylglycerides and free fatty acids and unexpectedly produces a blown, stripped plant-based oil having a very high flash point, which minimizes the chances of flash fires and/or explosions in high flash point environments and will also thermally degrade slower than petroleum based mineral oils having lower flash points.

In some preferable aspects, the blown, stripped plant-based oil comprises a high viscosity, low volatiles blown, stripped plant-based oil blend. In these aspects, the oil used for the blend preferably comprise corn stillage oil (as further described, below) and soybean oil. Typically, the weight ratio of corn stillage oil to soybean oil is from 1:2 to 3:1, preferably from 1:1 to 3:1, more preferably from 1.8:1 to 3:1, and more preferably from 1.8:1 to 2.5:1. The initial fatty acid content of the blend prior to blowing and stripping is from 4% to 9% by weight, preferably from 6% to 9%, more preferably from 8% to 9%, and more preferably from 8% to 8.6%.

In some other aspects, the bio-based binder system further comprises glycerol, polyglycerol, the reaction product of glycerol or polyglycerol with citric acid, and mixtures thereof. Typically the glycerol, polyglycerol, and/or reaction product of glycerol or polyglycerol with citric acid comprises from 0.1 percent by weight to 20 percent by weight of the bio-based binder system, for example, from 0.5 percent by weight to 10 percent by weight of the system, from 2 percent by weight to 7 percent by weight of the system, based on the weight of the system excluding the weight of water. Typically, the glycerol and/or polyglycerol utilized contain less than 500 ppm chloride ions. In certain aspects, the glycerol and/or polyglycerol contain less than 300 ppm, less than 200 ppm, less than 100 ppm, less than 70 ppm, or less than 50 ppm chloride ions. In some preferred aspects technical grade or USP grade glycerol is utilized having less than 30 ppm chloride ions, and preferably less than 20 ppm chloride ions (for example, less than 10 ppm chloride ions).

It is an advantage of the present invention that carbohydrates (e.g., maltodextrin) are readily available and are low in cost.

It is another advantage of the present invention that insulation products utilizing the inventive binder system can be manufactured using current manufacturing lines, thereby saving time and money.

It is a further advantage of the present invention that the binder system does not require added formaldehyde.

It is also an advantage of the present invention that the final insulation product has a light color at low loss on ignition (LOI) that allows the use of dyes, pigments, or other colorants to yield a variety of colors for the insulation product.

It is a feature of the present invention that the binder composition can be provided in an aqueous formulation that can be applied by conventional binder applicators, including spray applicators.

The foregoing and other objects, features, and advantages of the invention will appear more fully hereinafter from a consideration of the detailed description that follows. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION AND PREFERRED EMBODIMENTS OF THE INVENTION

Figure 1:
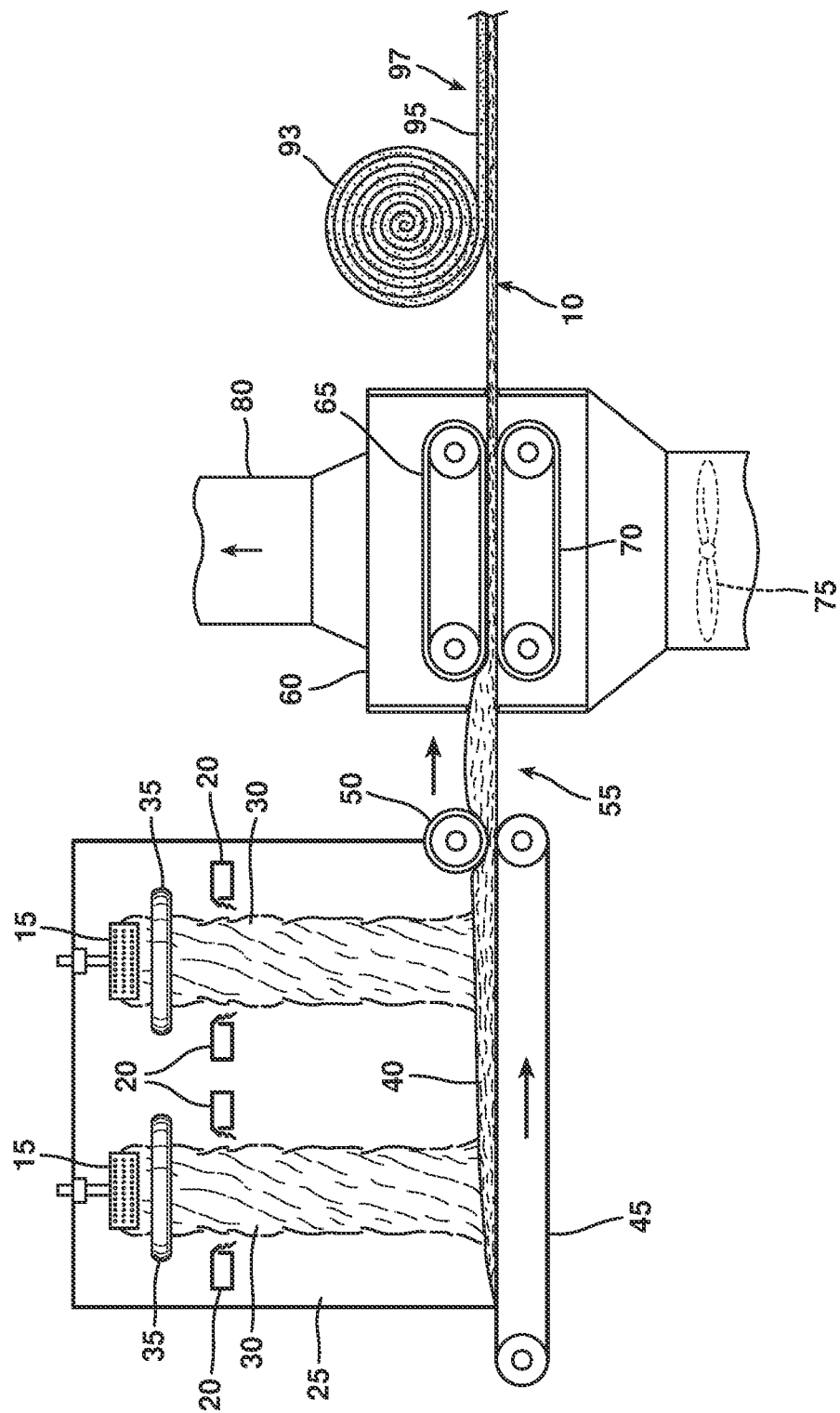
FIG. 1 is a schematic illustration of the formation of a faced insulation product made with the inventive bio-based binder system according to one exemplary embodiment.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, and any other references, are each incorporated by reference in their entireties, including all data, tables, figures, and text presented in the cited references, unless indicated otherwise.

In the drawings, the thickness of the lines, layers, and regions may be exaggerated for clarity. It will be understood that when an element such as a layer, region, substrate, or panel is referred to as being "on" another element, it can be directly on the other element or intervening elements may also be present. Also, when an element is referred to as being "adjacent" to another element, the element may be directly adjacent to the other element or intervening elements may be present. The terms "top", "bottom", "side", and the like are used herein for the purpose of explanation only. Like numbers found throughout the figures denote like elements.

"Flash Point" or "Flash Point Temperature" is a measure of the minimum temperature at which a material will initially flash with a brief flame. It is measured according to the method of ASTM D-92 using a Cleveland Open Cup and is reported in degrees Celsius (° C.).

"Pour Point" or "Pour Point Temperature" is a measure of the lowest temperature at which a fluid will flow. It is measured according to the method of ASTM D-97 and is reported in degrees Celsius (° C.).

"Iodine Value" (IV) is defined as the number of grams of iodine that will react with 100 grams of material being measured. Iodine value is a measure of the unsaturation (carbon-carbon double bonds and carbon-carbon triple bonds) present in a material. Iodine Value is reported in units of grams iodine ($I_2$) per 100 grams material and is determined using the procedure of AOCS Cd Id-92.

"Hydroxyl number" (OH#) is a measure of the hydroxyl (—OH) groups present in a material. It is reported in units of mg KOH/gram material and is measured according to the procedure of ASTM E1899-02.

"Acid Value" (AV) is a measure of the residual hydronium groups present in a compound and is reported in units of mg KOH/gram material. The acid number is measured according to the method of AOCS Cd 3d-63.

"Gardner Color Value" is a visual measure of the color of a material. It is determined according to the procedure of ASTM D1544, "Standard Test Method for Color of Transparent Liquids (Gardner Color Scale)". The Gardner Color scale ranges from colors of water-white to dark brown defined by a series of standards ranging from colorless to dark brown, against which the sample of interest is compared. Values range from 0 for the lightest to 18 for the darkest. For the purposes of the invention, the Gardner Color Value is measured on a sample of material at a temperature of 25° C.

"Loss on ignition (LOI)" is a measure of the amount of combustible material that is liberated from a cured fibrous insulation product sample, such as a cured fiberglass insulation, when placed in a muffle oven held at 1000° C. under one atmosphere of air for one hour. It is reported as the percentage of the weight lost by the material during the oven exposure (i.e. (the amount of weight loss from the material after complete oven exposure divided by the starting weight of the material)×100).

"Sulfur" content is based upon the elemental sulfur and sulfur containing compounds in a material, but only the weight percent of sulfur in such compounds is taken into account when determining the "sulfur" content.

The present invention relates to environmentally friendly, bio-based binder systems useful for the formation of fibrous insulation products (e.g. fiberglass insulation and stone wool insulation). The bio-based binder systems comprises both an aqueous curable binder composition and a dedust composition. The aqueous curable binder composition and dedust composition may be applied to the fibers to be bound (e.g fiberglass) simultaneously using the same application method or separately. Typically, they are applied concurrently, with the dedust composition being in the form of an emulsion (typically an oil-in-water emulstion) that is blended with the aqueous binder composition so that they can be applied together.

The Aqueous Curable Binder Composition

The carbohydrate and crosslinking agent are typically dissolved in water prior to being applied to the fibers (e.g. glass fibers). The water disperses (and/or dissolves) the active solids for application onto the reinforcement fibers. Water typically is added in an amount sufficient to dilute the aqueous binder composition to a viscosity that is suitable for its application to the reinforcement fibers and to achieve a desired solids content on the fibers. In particular, the binder composition may contain water in an amount from about 50% to about 98.0% by weight of the total solids in the binder composition.

The binder composition may be made by dissolving or dispersing the crosslinking agent in water to form a mixture. Next, the carbohydrate may be mixed with the crosslinking agent in the mixture to form the binder composition.

After the aqueous binder system is applied, it is heated to cause the crosslinking agent and the carbohydrate to react with one another. When the carbohydrate and the crosslinking agent are reacted together under heat the reaction that occurs is referred to as "curing" the binder composition. The resulting reaction product from the reaction of the carbohydrate and the crosslinking agent is referred to as the "cured" binder composition. The resulting cured binder composition typically is mainly comprised of polyesters that result from the reaction of the acid groups of the crosslinking agent with the alcohol groups of the carbohydrate. The polyesters that are formed typically form crosslinked network polymers that bind the fibers to one another. Since the reaction liberates water, the water is removed from the binder composition and the fibrous insulation product to promote the complete curing of the binder composition.

The range of components used in the binder composition according to embodiments of the invention is set forth in Table 1. As indicated earlier, these solids are dissolved (and/or suspended (preferably dissolved)) in water to provide a binder composition that can readily be applied to the fibers (e.g. glass fibers or stone wool fibers).

TABLE 1

| Component | % By Weight of Total Solids |
|---|---|
| Carbohydrate | 30-95 |
| Crosslinking Agent | 1-40 |

The Carbohydrate

In some exemplary embodiments the aqueous curable binder composition also includes one or more of a coupling agent, a moisture resistant agent, a catalyst, an inorganic acid or base, and/or an organic acid or base. In some aspects, the binder composition also includes glycerol, polyglycerol, the reaction product of glycerol or polyglycerol and citric acid, or mixtures thereof, as described earlier. At low LOIs, the binder typically has a light (e.g., white or tan) color after it has been cured. When utilized in the manufacture of fiberglass insulation, this will result in a product that can be readily died or colored. In addition, in some preferred aspects, the binder system is free of added formaldehyde.

In one or more exemplary embodiment, the binder composition includes at least one carbohydrate that is from natural and renewable resources. For instance, the carbohydrate may be derived from plant sources such as legumes, maize, corn, waxy corn, sugar cane, milo, white milo, potatoes, sweet potatoes, tapioca, rice, waxy rice, peas, sago, wheat, oat, barley, rye, amaranth, and/or cassava, as well as other plants that have a high starch content. The carbohydrate may also be derived from crude starch or cellulose-containing products derived from plants that contain residues of proteins, polypeptides, lipids, and low molecular weight carbohydrates. The carbohydrate may be selected from monosaccharides (e.g., xylose, glucose, and fructose), disaccharides (e.g., sucrose, maltose, and lactose), oligosaccharides (e.g., glucose syrup and fructose syrup), and polysaccharides and water-soluble polysaccharides (e.g., pectin, dextrin, maltodextrin, starch, modified starch, and starch derivatives).

The carbohydrate may have a number average molecular weight from about 1,000 to about 8,000. In some preferred aspects, the carbohydrate comprises a maltodextrin having a dextrose equivalent (DE) number from 2 to 20, from 7 to 11, or from 9 to 14. The carbohydrates and crosslinking agent beneficially result in an aqueous binder composition having a low viscosity that reacts at moderate temperatures (e.g., 80-250° C.). The low viscosity enables the aqueous binder composition to be more readily applied to fibers utilizing conventional equipment. In exemplary embodiments, the viscosity of the carbohydrate may be lower than 500 cps at 25° C., when in a 50% aqueous solution. The use of a carbohydrate in the aqueous curable binder composition is advantageous in that carbohydrates are readily available or easily obtainable and are low in cost. In at least one exemplary embodiment, the carbohydrate is a water-soluble polysaccharide such as maltodextrin having a dextrose equivalent (DE) number from 2 to 20. The carbohydrate may be present in the binder composition in an amount from about 30% to about 95% by weight of the total solids in the binder composition, from about 40% to about 80% by weight, or from about 50% to about 70% by weight. As used herein, % by weight indicates % by weight of the total solids in the binder composition.

The Crosslinking Agent

As set forth above, the aqueous curable binder composition also contains a crosslinking agent. The crosslinking agent may be any compound suitable for reacting with the carbohydrate, preferably to form a crosslinked polymer network. In exemplary embodiments, the crosslinking agent has a number average molecular weight greater than 90, from about 90 to about 10,000, or from about 190 to about 4,000. In some exemplary embodiments, the crosslinking agent has a number average molecular weight less than about 1000. Non-limiting examples of suitable crosslinking agents include polycarboxylic acids (and salts thereof), anhydrides, monomeric and polymeric polycarboxylic acid with anhydride (i.e., mixed anhydrides), citric acid (and salts thereof, such as ammonium citrate), 1,2,3,4-butane tetracarboxylic acid, adipic acid (and salts thereof), polyacrylic acid (and salts thereof), and polyacrylic acid based resins such as QXRP 1734 and Acumer 9932, both commercially available from The Dow Chemical Company. In exemplary embodiments, the crosslinking agent may be any monomeric or polymeric polycarboxylic acid, citric acid, and their corresponding salts. In some embodiments, the crosslinking agent preferably comprises citric acid. The crosslinking agent may be present in the aqueous curable binder composition in an amount up to about 40% by weight of solids in the aqueous curable binder composition. In exemplary embodiments, the crosslinking agent may be present in the aqueous curable binder composition in an amount from about 5.0% to about 40% by weight of the total solids in the binder composition, from about 10% to about 40% by weight, or from about 20% to about 35% by weight.

Additional Optional Components of the Aqueous Curable Binder Composition

If necessary, the pH of the mixture may be adjusted to the desired pH level with organic and inorganic acids and bases.

The aqueous curable binder composition may also contain a coupling agent. Typically, the coupling agent comprises a silane. Table 2 sets forth the typical weight percent of the components of the binder composition when a silane couple agent is included.

TABLE 2

| Component | % By Weight of Total Solids |
|---|---|
| Carbohydrate | 30-95 |
| Silane Coupling Agent | 1-40 |
| Crosslinking Agent | 1-40 |

Typically, the coupling agent is a silane coupling agent. The coupling agent(s) may be present in the aqueous curable binder composition in an amount typically from about 0.01% to about 5.0% by weight of the total solids in the binder composition, from about 0.01% to about 2.5% by weight, or from about 0.1% to about 0.5% by weight. Non-limiting examples of silane coupling agents that may be used in the binder composition may be characterized by the functional groups alkyl, aryl, amino, epoxy, vinyl, methacryloxy, ureido, isocyanato, and mercapto. In exemplary embodiments, the silane coupling agent(s) include silanes containing one or more nitrogen atoms that have one or more functional groups such as amine (primary, secondary, tertiary, and quaternary), amino, imino, amido, imido, ureido, or isocyanato. Specific, non-limiting examples of suitable silane coupling agents include, but are not limited to, aminosilanes (e.g., 3-aminopropyl-triethoxysilane and 3-aminopropyl-trihydroxysilane), epoxy trialkoxysilanes (e.g., 3-glycidoxypropyltrimethoxysilane and 3-glycidoxypropyltriethoxysilane), methyacryl trialkoxysilanes (e.g., 3-methacryloxypropyltrimethoxysilane and 3-methacryloxypropyltriethoxysilane), hydrocarbon trialkoxysilanes, amino trihydroxysilanes, epoxy trihydroxysilanes, methacryl trihydroxy silanes, and/or hydrocarbon trihydroxysilanes. In one or more exemplary embodiment, the silane is an aminosilane, such as γ-aminopropyltriethoxysilane.

Further exemplary coupling agents (including silane coupling agents) suitable for use in the binder composition are set forth below:
- Acryl: 3-acryloxypropyltrimethoxysilane; 3-acryloxypropyltriethoxysilane; 3-acryloxypropylmethyldimethoxysilane; 3-acryloxypropylmethyldiethoxysilane; 3-methacryloxypropyltrimethoxysilane; 3-methacryloxypropyltriethoxysilane
- Amino: aminopropylmethyldimethoxysilane; aminopropyltriethoxysilane; aminopropyltrimethoxysilane/EtOH; aminopropyltrimethoxysilane; N-(2-aminoethyl)-3-aminopropyltrimethoxysilane; N-(2-aminoethyl)-3-aminopropylmethyldimethoxysilane; (2-aminoethyl)-(2-aminoethyl) 3-aminopropyltrimethoxysilane; N-phenylaminopropyltrimethoxysilane
- Epoxy: 3-Glycidoxypropylmethyldiethoxysilane; 3-glycidoxypropylmethyldimethoxy silane; 3-glycidoxypropyltriethoxysilane; 2-(3,4-eoxycyclohexyl)ethylmethyldimethoxysilane; 2-(3,4-epoxycyclohexyl) ethylmethyldiethoxysilane; 2-(3,4-epoxycyclohexyl) ethyltrimethoxysilane; 2-(3,4-Epoxycyclohexyl) ethyltriethoxy silane
- Mercapto: 3-mercaptopropyltrimethoxysilane; 3-Mercaptopropyltriethoxysilane; 3-mercaptopropylmethyldimethoxysilane; 3-Mercaptopropylmethyldiethoxysilane
- Sulfide: bis[3-(triethoxysilyl)propyl]-tetrasulfide; bis[3-(triethoxysilyl)propyl]-disulfide
- Vinyl: vinyltrimethoxysilane; vinyltriethoxysilane; vinyl tris(2-methoxyethoxy)silane; vinyltrichlorosilane; trimethylvinylsilane
- Alkyl: methyltrimethoxysilane; methyltriethoxysilane; dimethyldimethoxysilane; dimethyldiethoxysilane; tetramethoxysilane; tetraethoxysilane; ethyltriethoxysilane; n-propyltrimethoxysilane; n-propyltriethoxysilane; isobutyltrimethoxysilane; hexyltrimethoxysilane; hexyltriethoxysilane; octyltrimethoxysilane; decyltrimethoxysilane; decyltriethoxysilane; octyltriethoxysilane; tert-butyldimethylchlorosilane; cyclohexylmethyldimethoxysilane; dicylohexyldimethoxysilane; cyclohexylethyldimethoxysilane; t-butylmethyldimethoxysilane
- Chloroalkyl: 3-chloropropyltriethoxysilane; 3-chloropropyltrimethoxysilane; 3-chloropropylmethyldimethoxysilane
- Perfluoro: decafluoro-1,1,2,2-tetrahydrodecyl)trimethoxysilane; ((heptadecafluoro-1,1,2,2-tetrahydrodecyl) trimethoxysilane
- Phenyl: phenyltrimethoxysilane; phenyltriethoxysilane; diphenyldiethoxysilane; diphenyldimethoxysilane; diphenyldichlorosilane
- Hydrolyzates of the silanes listed above
- Zirconates: zirconium acetylacetonate; zirconium methacrylate
- Titanates: tetra-methyl titanate; tetra-ethyl titanate; tetra-n-propyl titanate; tetra-isopropyl titanate; tetra-isobutyl titanate; tetra-sec-butyl titanate; tetra-tert-butyl titanate; mono n-butyl, trimethyl titanate; mono ethyl tricyclohexyl titanate; tetra-n-amyl titanate; tetra-n-hexyl titanate; tetra-cyclopentyl titanate; tetra-cyclohexyl titanate; tetra-n-decyl titanate; tetra n-dodecyl titanate; tetra (2-ethyl hexyl) titanate; tetra octylene glycol titanate ester; tetrapropylene glycol titanate ester; tetra benzyl titanate; tetra-p-chloro benzyl titanate; tetra 2-chloroethyl titanate; tetra 2-bromoethyl titanate; tetra 2-methoxyethyl titanate; tetra 2-ethoxyethyl titanate.

If desired, a cure accelerator (i.e., catalyst) may optionally be added to the aqueous curable binder composition. The catalyst is used to assist the reaction between the crosslinking agent and carbohydrate. The catalyst may include inorganic salts, Lewis acids (i.e., aluminum chloride or boron trifluoride), Brönsted acids (i.e., sulfuric acid, p-toluenesulfonic acid and boric acid) organometallic complexes (i.e., lithium carboxylates, sodium carboxylates), and/or Lewis bases (i.e., polyethyleneimine, diethylamine, or triethylamine). Additionally, the catalyst may include an alkali metal salt of a phosphorous-containing organic acid; in particular, alkali metal salts of phosphorus acid, hypophosphorus acid, or polyphosphoric acids. Examples of such phosphorus catalysts include, but are not limited to, sodium hypophosphite, sodium phosphate, potassium phosphate, disodium pyrophosphate, tetrasodium pyrophosphate, sodium tripolyphosphate, sodium hexamethaphosphate, potassium phosphate, potassium tripolyphosphate, sodium trimetaphosphate, sodium tetramethaphosphate, and mixtures thereof. In addition, the catalyst or cure accelerator may be a fluoroborate compound such as fluoroboric acid, sodium tetrafluoroborate, potassium tetrafluoroborate, calcium tetrafluoroborate, magnesium tetrafluoroborate, zinc tetrafluoroborate, ammonium tetrafluoroborate, and mixtures thereof. Further, the catalyst may be a mixture of phosphorus and fluoroborate compounds. Other sodium salts such as, sodium sulfate, sodium nitrate, sodium carbonate may also or alternatively be used as the catalyst/accelerator. Additionally, citric acid that has been partially neutralized with a Group I metal base, such as sodium hydroxide, or which has been reacted with trisodium citrate may be utilized as a cure accelerator. The catalyst or cure accelerator may be present in the binder composition in an amount from about 0% to about 10% by weight of the total solids in the binder composition, from about 1.0% to about 5.0% by weight, or from about 3.0% to about 5.0% by weight.

Table 3 provides typical weight ratios of the components of the aqueous curable binder compositions when a silane coupling agent and a catalyst are utilized. These components are all dissolved in water. Typically, the ratios of solids to water range from 1:100 to 50:100.

TABLE 3

| Component | % By Weight of Total Solids |
| --- | --- |
| Carbohydrate | 30-95 |
| Silane Coupling Agent | 1-40 |
| Crosslinking Agent | 1-40 |
| Catalyst/accelerator | 1-10 |

The aqueous curable binder composition may also include organic and/or inorganic acids and bases in an amount sufficient to adjust the pH to a desired level. The pH may be adjusted depending on the intended application, or to facilitate the compatibility of the ingredients of the binder composition. In exemplary embodiments, the pH adjuster is utilized to adjust the pH of the binder composition to an acidic pH. Examples of suitable acidic pH adjusters include inorganic acids such as, but not limited to sulfuric acid, phosphoric acid and boric acid and also organic acids like mono- or poly-carboxylic acids, such as, but not limited to, citric acid, acetic acid, anhydrides thereof, and their corresponding salts. Also, inorganic salts that can be acid precursors may be utilized. The acid adjusts the pH, and in some instances, as discussed above, acts as a crosslinking agent. The pH of the curable binder typically ranges from about 1 to about 7, from about 2 to about 5, or from about 2 to about 4. In at least one exemplary embodiment, the pH of the aqueous curable binder composition is from about 2.6 to about 3.5.

Further, the aqueous curable binder composition may contain a moisture resistant agent, such as alum, aluminum sulfate, latex, a silicon emulsion, reactive silicone emulsion, a hydrophobic polymer emulsion (e.g., polyethylene emulsion or polyester emulsion), and mixtures thereof. In at least one exemplary embodiment, the latex is in the form of an aqueous latex emulsion. The latex emulsion includes latex particles that are typically produced by emulsion polymerization. In addition to the latex particles, the latex emulsion may include water, a stabilizer such as ammonia, and a surfactant. The moisture resistant agent may be present in the binder composition in an amount from about 0% to about 20% by weight of the total solids in the binder composition, from about 5.0% to about 10% by weight, or from about 5.0% to about 7.0% by weight.

The aqueous curable binder composition may optionally contain conventional additives such as, but not limited to corrosion inhibitors, dyes, pigments, fillers, colorants, UV stabilizers, thermal stabilizers, anti-foaming agents, antioxidants, emulsifiers, preservatives (e.g., sodium benzoate), biocides, fungicides, and mixtures thereof. Other additives may be added to the aqueous curable binder composition for the improvement of process and product performance. Such additives include lubricants, wetting agents, surfactants, antistatic agents, and/or water repellent agents. Additives may be present in the binder composition from trace amounts (such as <about 0.1% by weight the binder composition) up to about 10.0% by weight of the total solids in the aqueous curable binder composition. In some exemplary embodiments, the additives are present in an amount from about 0.1% to about 5.0% by weight of the total solids in the aqueous curable binder composition, from about 1.0% to about 4.0% by weight, or from about 1.5% to about 3.0% by weight.

Dedust Composition

The dedust composition is applied to the fibers to reduce the amount of dust that is generated during the manufacture of the fibrous insulation product.

The dedust composition comprises a blown, stripped plant-based oil. The dedust composition may be applied as a neat blown, stripped plant-based oil to the fibers or the dedust composition may be applied in the form of an oil in water emulsion comprising the blown, stripped plant-based oil. The dedust composition typically is applied concurrently to the fibers with the aqueous curable binder composition.

If the dedust composition is in the form of an oil in water emulsion, then preferably at least one emulsifying component is utilized to form the oil in water emulsion. The emulsion typically is typically formed by vigorously agitating the water and the oil in the presence of the at least one emulsifying component. Examples of apparatus that can be utilized to effectively used to form the oil in water emulsion include high shear mechanical devices/mixers, ultrasonic devices, and other equipment/devices known to those of skill in the art for use in forming oil in water emulsions. The weight ratio of the at least one emulsifying components to blown, stripped plan-based oil is from 1:200 to 15:100, for example from 1:200 to 5:100, from 1:200 to 3:100 by weight.

Typically, excluding the weight of any water present in the dedust composition, the dedust composition is present in a cured fiberglass insulation product of the invention at a weight percent of from about 0.1 to about 5% by weight of glass present (for example, from about 0.5 to about 4.0%, or from about 0.5% to about 3.0% by weight (and in some instances from 0.6% to 1.5% by weight) of the glass present). Excluding the weight of water, the weight ratio of the dedust composition to the solids of the aqueous curable binder composition is from about 1/100 to 34/100, for example from about 6/100 to 13/100, from about 4/100 to 10/100.

In one aspect the at least one emulsifying component comprises a single emulsifier that is utilized to form the emulsion. In this aspect, the emulsifier typically is mixed into the blown, stripped plant-based oil before water is introduced to form the emulsion. Examples of emulsifiers that can be utilized include, for example, ionic emulsifiers, non-ionic emulsifiers and mixtures thereof. To minimize competing reactions between the emulsifier and the components of the aqueous curable binder composition, non-ionic emulsifiers preferably are utilized. Examples of non-ionic emulsifiers include: alkoxylated alcohols and alkoxylated fatty acids. Examples of ionic emulsifiers include amine-based emulsifiers (i.e. primary, secondary, tertiary, and quaternary amine-based emulsifiers). Preferably ethoxylated alcohols and ethoxylated fatty acids are utilized. Most preferably, ethoxylated alcohols are utilized.

In another aspect, the at least one emulsifying component comprises a first emulsifying component that is blended into the blown, stripped plant-based oil, and a second emulsifying component that is blended into the water that is utilized to form the oil in water emulsion with the oil. Preferably, in this aspect the first emulsifying component and the second emulsifying component are mixed into the oil and water respectively before the oil and water are mixed together to form the oil in water emulsion. Examples of compounds that may be used for the first emulsifying component include the emulsifiers listed above. Examples of compounds that may be used for the second emulsifying component include: carboxymethylcellulose; maltodextrin; carbohydrates; polyols; natural viscosifiers, such as, xanthan gum, guar gum, schleroglucan; and mixtures thereof. Preferably, the second emulsifying component will increase the viscosity of the water and assist the formation of the oil in water emulsion and enhance the long term stability of the oil in water emulsion. For example, preferably the second emulsifying component will provide an aqueous-based solution having a viscosity of from 15 to 35 centipoise at 25° C., for example from 17 to 33 centipoise at 25° C., preferably from 18 to 25 centipoise at 25° C. for an aqueous solution containing less than 1 percent by weight of the second emulsifying component, preferably less than 0.5 percent by weight (for example less than 0.3 percent by weight) of the second emulsifying component. For stability, in some aspects, the oil in water emulsion will be stable for at least 4 hours, more preferably at least 14 hours and in some instances at least 24 hours (for example, at least 48 hours, 72, hours, 96, hours, or 120 hours. Where long term stability is particularly important, the oil in water emulsion will be stable for at least one week, and in some instances at least two weeks (for example, at least three weeks). Preferably the second emulsifying component comprises carboxymethylcellulose.

Blown, Stripped Plant-Based Oil

The dedust composition comprises a blown, stripped plant-based oil having a high flash point that will help minimize the chances of flash fires and/or explosions in high temperature environments and will also degrade slower than petroleum based mineral oils having lower flash points. Typically, this blown, stripped plant-based oil has a flash point of at least 293° C., preferably at least 296° C., more preferably at least 304° C., and in some instances at least 320° C. And, the blown, stripped plant-based oil typically has a viscosity at 40° C. of at least 150 cSt, preferably at least 200 cSt (for example, at least 250 cSt), more preferably at least 300 cSt, and in some instances at least 400 cSt (for example, at least 450 cSt) at 40° C. When high temperature operations are particularly important, the blown, stripped plant-based oil may have a viscosity of at least 500 cSt at 40° C. (for example, at least 550 cSt at 40° C.).

Plant-based oils that may be utilized to manufacture the blown, stripped plant-based oil are recovered from plants and algae. Plant-based oils that can be utilized to manufacture the blown, stripped plant-based oil include, for example, soybean oil, canola oil, rapeseed oil, cottonseed oil, sunflower oil, palm oil, peanut oil, safflower oil, corn oil, corn stillage oil (as further described below), and mixtures thereof. Due to its relatively low polyunsaturation levels, relatively high mono- and di-unsaturation levels and other properties as further described below, the preferred plant-based oils utilized for manufacturing the blown, stripped plant-based oil are corn stillage oil, or in a particularly preferred aspect, a blend of corn stillage oil with other oils, such as soybean oil. If a blend of corn stillage oil is utilized, the preferred oil to blend with corn stillage oil is soybean oil, due to its relatively higher level of polyunsaturates compared to corn stillage oil.

"Corn stillage oil" comprises monoglycerides, diglycerides, triglycerides, free fatty acids, and glycerol recovered from the residual liquids resulting after the distillation of ethanol from the fermentation of dry corn. The corn stillage oil is recovered by suitable means, preferably by centrifugation of the residual material remaining after the ethanol has been distilled off. Centrifugation typically recovers twenty five percent of the corn stillage oil originally present in the residual material being centrifuged.

The corn stillage oil recovered by centrifugation typically: has an acid value from 16 to 32 mg KOH/gram (for example, from 18 to 30 mg KOH/gram); has an iodine value from 110 to 120 g $I_2$/100 g sample; and contains from 0.05 to 0.29 percent by weight monoacylglycerides, from 1.65-7.08 percent by weight diacylglycerides, from 70.00 to 86.84 percent by weight triacylglycerides, from 8 to 16 percent by weight (for example, from 9 to 15 percent by weight) free fatty acids, and from 0.00 to 0.20 weight percent glycerin. Typically, the corn stillage oil has from 53 to 55 percent by weight groups derived from diunsaturated fatty acids, from 39 to 43 percent by weight groups derived from monounsaturated fatty acids, from 15 to 18 percent by weight groups derived from saturated fatty acids, and from 1 to 2 percent by weight groups derived from triunsaturated fatty acids. The groups derived from each of the above fatty acids are present either as groups within the mono-, di-, and tri-acylglycerides or as free fatty acids.

The free fatty acid content of the corn stillage oil most commonly is from about 11 to 12 percent (an acid value of from about 22 to 24 mg KOH/gram) and is very high compared to conventional vegetable oils, including RBD soybean oil.

The blown, stripped plant-based oil typically is made by blowing air through the plant-based oil for a sufficient period of time at an appropriate temperature to produce highly polymerized oil. For example, air is blown (sparged through) the plant-based oil being maintained at a temperature of from 90° C. to 125° C. (preferably from 100° to 120° C. and more preferably from 105° C. to 115° C.) typically for from 20 to 60 hours (preferably from 24 to 42 hours).). The acid value of the blown plant-based oil typically is from about 6 mg KOH/gram to about 25 mg KOH/gram. The resulting polymerized oil is then relatively heavily stripped. During the stripping, the blown oil typically is heated to a temperature from 230° C. to 270° C. (preferably from 235° to 245° C.) and vacuum stripped at a pressure of 100 torr or less, preferably 75 torr or less, and more preferably 50 torr or less for typically from 10 to 40 hours (preferably from 20 to 30 hours).

Typically, the oil is stripped until the acid value of the oil is less than 5 mg KOH/gram, preferably about 3.5 mg KOH/gram or less, and in some instances about 3.0 mg KOH/gram or less, and further about 2.8 mg KOH/gram or less. In some instances where a particularly low acid value is beneficial, the oil is stripped until the acid value is 1.0 mg KOH/gram or less, preferably 0.5 mg KOH/gram or less. The stripping reduces the content of free fatty acids and other volatiles. During the stripping process, the blown plant-based oil is also bodied. Typically, the final blown, stripped planted-based oil has a higher viscosity than the initial viscosity of the blown plant-based oil before stripping. The stripping also removes lower molecular weight acylglycerides and free fatty acids and unexpectedly can produce a blown stripped plant-based oil having a very high flash point, as set forth above. The final hydroxyl number of the blown, stripped plant-based oil is typically from 10 mg KOH/gram to 200 mg KOH/gram, preferably, the hydroxyl number of the blown, stripped oil blend typically is less than 50 mg KOH/gram, preferably less than 40 mg KOH/gram, and in some instances less than 30 mg KOH/gram, for example less than 25 mg KOH/gram.

The inventors have surprisingly found that a polyol (preferably glycerol) can be utilized during the stripping to enhance the reduction of the acid value of the blown, stripped plant-based oil to a desirably low level. In one preferred aspect, the blown plant-based oil is stripped under vacuum until the acid value reached from 5 mg KOH/gram to about 9 mg KOH/gram, preferably from about 7 mg KOH/gram to about 9 mg KOH/gram. Then sufficient polyol (preferably glycerin) is added to the oil to obtain a ratio of moles of hydroxyl groups added to fatty acid groups of typically from 1:5 to less than 1:1, preferably from 1:4 to 9:10, more preferably from 2:5 to 4:5, and further more preferably from 1:2 to 4:5. Where particularly low acid value is beneficial, preferably sufficient polyol is added to provide a ratio of moles hydroxyl groups added to fatty acid of from 4:5 to 1:1. The vacuum is removed either prior to or soon after the polyol addition, preferably prior to the polyol addition. A slight nitrogen sparge is maintained through the oil to assist in the removal of any water or other volatile compounds from the oil. Preferably, the stripping is continued until the acid value of the oil is below 5.0 mg KOH/gram, and more preferably about 3.5 mg KOH/gram or less. In this aspect the final hydroxyl number of the blown, stripped plant-based oil is typically less than 50 mg KOH/gram, preferably less than 40 mg KOH/gram, and more preferably less than 30 mg KOH/gram, sometimes less than 25 mg KOH/gram. When the plant-based oil comprises corn stillage oil, the hydroxyl number is typically from about 23 to 29 mg KOH/gram. The viscosity of the blown, stripped plant-based oil is at least about 150 cSt at 40° C., preferably at least 200 cSt at 40° C. For high temperature applications, the viscosity is typically at least 300 cSt at 40° C., preferably at least 400 cSt at 50° C., and in some instances at least about 500 cSt at 40° C. (for example, at least 550 cSt at 40° C.). Examples of polyols that may be utilized include, but are not limited to, trimethylol propane ("TMP"), polyethylene glycol ("PEG"), pentaerythritol, glycerin, and polyglycerol.

Examples of other polyols that may be utilized include, but are not limited to, trimethylol propane ("TMP"), polyethylene glycol ("PEG"), pentaerythritol, and polyglycerol.

In certain preferred aspects of the invention, the polyol (e.g. glycerol) contains less than 500 ppm chloride ions. In certain aspects, the polyol contains less than 300 ppm, less than 200 ppm, less than 100 ppm, less than 70 ppm, or less than 50 ppm chloride ions. Reduced chloride ion concentrations may minimize corrosion concerns in products that are manufactured utilizing a blown, stripped plant-based oil of the present invention. In one particularly preferred aspect, the polyol comprises technical grade or USP glycerol, typically having less than 30 ppm chloride ions and preferably less than 20 ppm chloride ions (for example less than 10 ppm chloride ions).

In one aspect of the above embodiments, a plant-based oil having less than 2 percent by weight (preferably less than 1 percent by weight) triene unsaturation (18:3 fatty acid content) may be added to the blown, stripped plant-based oil to reduce its viscosity, without unfavorably affecting the odor profile or the flash point of the resulting blown, stripped plant-based oil. Examples of plant-based oils having less than 2 percent by weight 18:3 unsaturation include sunflower oil (including NuSun sunflower oil), corn oil, cottonseed oil, palm olein oil, safflower oil, and mixtures thereof.

The weight loss of the blown, stripped plant-based oil when measured using thermal gravimetric analysis at a temperature of from about 293° C. to 304° C. for 25-35 minutes ("TGA") typically is less than 30 weight percent, sometimes less than 25 weight percent, preferably less than 20 weight percent and in some instances less than 15 weight percent. An example of the TGA procedures that can be used is the Noack Engine Oil Volatility (ASTM 5800-80) that has been modified for the appropriate temperature and duration as described below. The temperature and time utilized for measuring the weight loss of the blown, stripped plant-based oil should be adapted based on the predicted temperature profile that the oil will be exposed to during the manufacture of the fibrous insulation product. For example, if the oil will be exposed to temperatures of about 293° C. to 296° C. for a period of 20 minutes to 45 minutes, then the TGA typically would be carried out at or slightly above the highest predicted operating temperature of 296° C. (for example 298° C.) and for a sufficient time to predict the behavior of the oil during the manufacture of the fibrous insulation product (for example for a period of at least 45 minutes). The weight loss during the TGA is proportional to the amount of volatiles that may be liberated during the manufacture of the fibrous insulation product. The inventors have surprisingly found that the blown, stripped plant-based oils utilized in the invention have much lower weight loss than typical petroleum-based oils under high temperature operating conditions.

Fibrous Insulation Products

In one exemplary embodiment, the binder composition is used to form a fibrous insulation product. Fibrous insulation products are generally formed of matted inorganic fibers bonded together by a cured thermoset polymeric material. Examples of suitable inorganic fibers include glass fibers, wool glass fibers, stone wool fibers, and ceramic fibers. Optionally, other reinforcing fibers such as natural fibers and/or synthetic fibers such as polyester, polyethylene, polyethylene terephthalate, polypropylene, polyamide, aramid, and/or polyaramid fibers may be present in the insulation product in addition to the glass fibers. The term "natural fiber" as used in conjunction with the present invention refers to plant fibers extracted from any part of a plant, including, but not limited to, the stem, seeds, leaves, roots, or phloem. Examples of natural fibers suitable for use as the reinforcing fiber material include basalt, cotton, jute, bamboo, ramie, bagasse, hemp, coir, linen, kenaf, sisal, flax, henequen, and combinations thereof. Insulation products may be formed entirely of one type of fiber, or they may be formed of a combination of types of fibers. For example, the insulation product may be formed of combinations of various types of glass fibers or various combinations of different inorganic fibers and/or natural fibers depending on the desired application for the insulation. The embodiments described herein are with reference to insulation products formed entirely of glass fibers.

Figure 2:
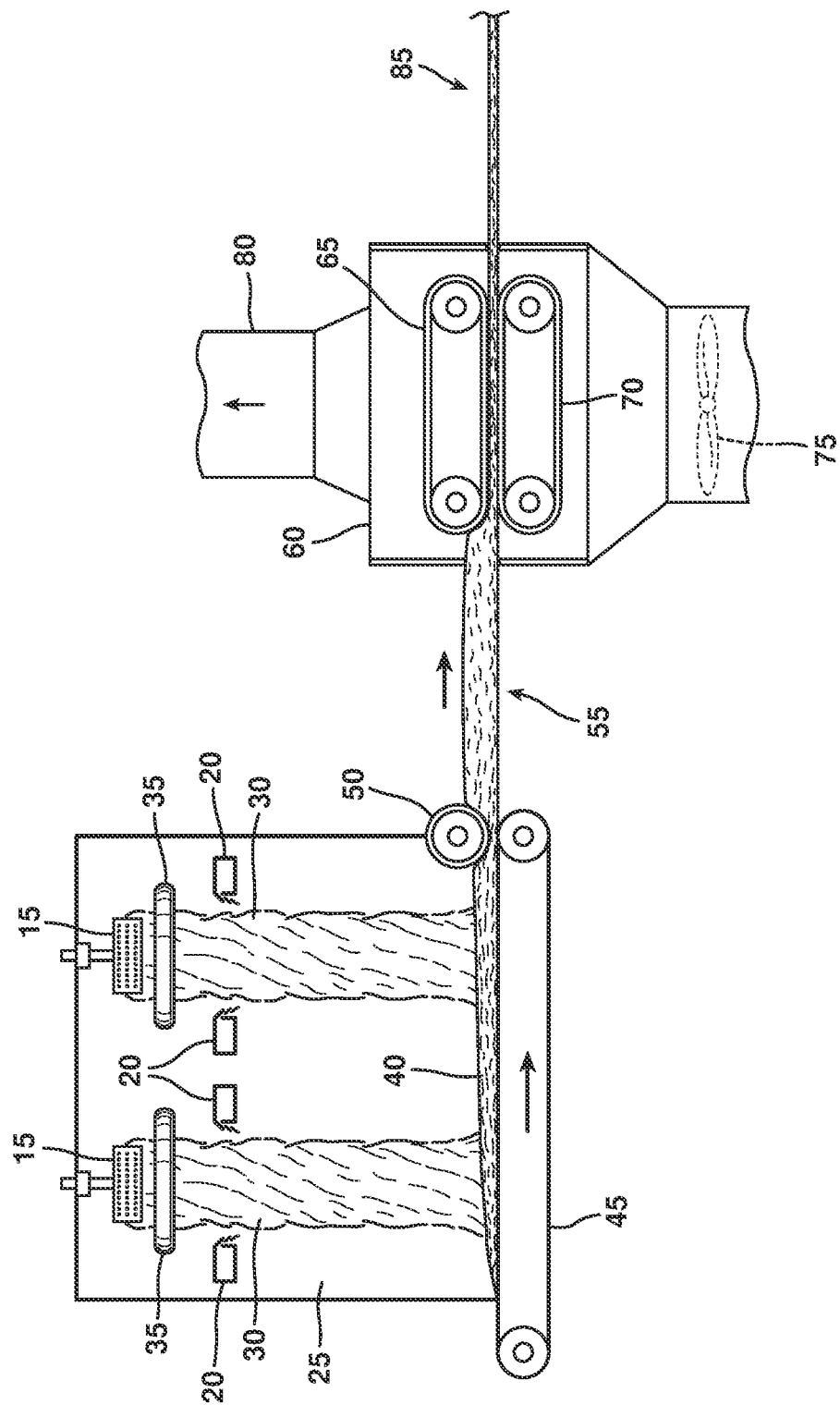
FIG. 2 is an elevational view of a manufacturing line for producing a fiberglass insulation product with the inventive bio-based binder system where the insulation product does not contain a facing material according to another exemplary embodiment of the present invention.

The manufacture of glass fiber insulation may be carried out in a continuous process by fiberizing molten glass, immediately forming a fibrous glass batt on a moving conveyor, and curing the binder on the fibrous glass insulation batt to form an insulation blanket as depicted in FIGS. 1 and 2. Glass may be melted in a tank (not shown) and supplied to a fiber forming device such as a fiberizing spinner 15. The spinners 15 are rotated at high speeds. Centrifugal force causes the molten glass to pass through holes in the circumferential sidewalls of the fiberizing spinners 15 to form glass fibers. Glass fibers 30 of random lengths may be attenuated from the fiberizing spinners 15 and blown generally downwardly, that is, generally perpendicular to the plane of the spinners 15, by blowers 20 positioned within a forming chamber 25. It is to be appreciated that the glass fibers 30 may be the same type of glass or they may be formed of different types of glass. It is also within the purview of the present invention that at least one of the fibers 30 formed from the fiberizing spinners 15 is a dual glass fiber where each individual fiber is formed of two different glass compositions.

The blowers 20 turn the fibers 30 downward to form a fibrous batt 40. The glass fibers 30 may have a diameter from about 2 to about 9 microns, or from about 3 to about 6 microns. The small diameter of the glass fibers 30 helps to give the final insulation product a soft feel and flexibility.

The glass fibers, while in transit in the forming chamber 25 and while still hot from the drawing operation, are sprayed with the bio-based binder system. Preferably, the dedust composition is in the form of an emulsion and is mixed with the aqueous curable binder composition before being sprayed onto the glass fibers through an annular spray ring 35 so as to result in a distribution of the binder composition throughout the formed insulation pack 40 of fibrous glass. Alternatively, the dedust composition may be applied to the fibers separately from the aqueous curable binder composition through another spray ring. Water may also be applied to the glass fibers 30 in the forming chamber 25, such as by spraying, prior to the application of the aqueous curable binder composition to at least partially cool the glass fibers 30. The binder composition may be present in an amount from less than or equal to 30% by weight of the total product. The dedust composition typically is present in an amount from 0.1 to 5.0 percent by weight of the total product.

The glass fibers 30 having the bio-based binder system (including the uncured binder composition) adhered thereto may be gathered and formed into an uncured insulation pack 40 on an endless forming conveyor 45 within the forming chamber 25 with the aid of a vacuum (not shown) drawn through the fibrous pack 40 from below the forming conveyor 45. The residual heat from the glass fibers 30 and the flow of air through the fibrous pack 40 during the forming operation are generally sufficient to volatilize a majority of the water from the binder before the glass fibers 30 exit the forming chamber 25, thereby leaving the remaining components of the binder on the fibers 30 as a viscous or semi-viscous high-solids liquid.

The coated fibrous pack 40, which is in a compressed state due to the flow of air through the pack 40 in the forming chamber 25, is then transferred out of the forming chamber 25 under exit roller 50 to a transfer zone 55 where the pack 40 vertically expands due to the resiliency of the glass fibers. The expanded insulation pack 40 is then heated, such as by conveying the pack 40 through a curing oven 60 where heated air is blown through the insulation pack 40 to evaporate any remaining water in the binder, cure the binder, and rigidly bond the fibers together. Heated air is forced though a fan 75 through the lower oven conveyor 70, the insulation pack 40, the upper oven conveyor 65, and out of the curing oven 60 through an exhaust apparatus 80. The cured binder imparts strength and resiliency to the insulation blanket 10. It is to be appreciated that the drying and curing of the binder may be carried out in either one or two different steps. The two stage (two-step) process is commonly known as B-staging.

Also, in the curing oven 60, the insulation pack 40 may be compressed by upper and lower foraminous oven conveyors 65, 70 to form a fibrous insulation blanket 10. It is to be appreciated that the insulation blanket 10 has an upper surface and a lower surface. In particular, the insulation blanket 10 has two major surfaces, typically a top and bottom surface, and two minor or side surfaces with fiber blanket 10 oriented so that the major surfaces have a substantially horizontal orientation. The upper and lower oven conveyors 65, 70 may be used to compress the insulation pack 40 to give the insulation blanket 10 a predetermined thickness. It is to be appreciated that although FIG. 1 depicts the conveyors 65, 70 as being in a substantially parallel orientation, they may alternatively be positioned at an angle relative to each other (not illustrated).

The curing oven 60 may be operated at a temperature from about 100° C. to about 325° C., or from about 250° C. to about 300° C. The insulation pack 40 may remain within the oven for a period of time sufficient to crosslink (cure) the binder and form the insulation blanket 10.

A facing material 93 may then be placed on the insulation blanket 10 to form a facing layer 95. Non-limiting examples of suitable facing materials 93 include Kraft paper, a foil-scrim-Kraft paper laminate, recycled paper, and calendared paper. The facing material 93 may be adhered to the surface of the insulation blanket 10 by a bonding agent (not shown) to form a faced insulation product 97. Suitable bonding agents include adhesives, polymeric resins, asphalt, and bituminous materials that can be coated or otherwise applied to the facing material 93. The faced fibrous insulation 97 may subsequently be rolled for storage and/or shipment or cut into predetermined lengths by a cutting device (not illustrated). Such faced insulation products may be used, for example, as panels in basement finishing systems, as duct-wrap, ductboard, as faced residential insulation, and as pipe insulation. It is to be appreciated that, in some exemplary embodiments, the insulation blanket 10 that emerges from the oven 60 is rolled onto a take-up roll or cut into sections having a desired length and is not faced with a facing material 93. Optionally, the insulation blanket 10 may be slit into layers and by a slitting device and then cut to a desired length (not illustrated).

A significant portion of the insulation placed in the insulation cavities of buildings is in the form of insulation blankets rolled from insulation products such as is described above. Faced insulation products are installed with the facing placed flat on the edge of the insulation cavity, typically on the interior side of the insulation cavity. Insulation products where the facing is a vapor retarder are commonly used to insulate wall, floor, or ceiling cavities that separate a warm interior space from a cold exterior space. The vapor retarder is placed on one side of the insulation product to retard or prohibit the movement of water vapor through the insulation product.

The presence of water, dust, and/or other microbial nutrients in the insulation product 10 may support the growth and proliferation of microbial organisms. Bacterial and/or mold growth in the insulation product may cause odor, discoloration, and deterioration of the insulation product 10, such as, for example, deterioration of the vapor barrier properties of the Kraft paper facing. To inhibit the growth of unwanted microorganisms such as bacteria, fungi, and/or mold in the insulation product 10, the insulation pack 40 may be treated with one or more anti-microbial agents, fungicides, and/or biocides. The anti-microbial agents, fungicides, and/or biocides may be added during manufacture or in a post manufacture process of the insulation product 10. It is to be appreciated that the insulation product made using the inventive bio-based binder system can be a fiberglass batt as depicted, or as loosefill insulation, ductboard, ductliner, or pipe wrap (not depicted in the Figures).

There are numerous advantages provided by the inventive bio-based binder system. For example, unlike conventional urea-formaldehyde binders, fibrous insulation products made using the inventive bio-based binder system may have a light color after curing. In addition, the carbohydrate is natural in origin and derived from renewable resources. By lowering or eliminating formaldehyde emission, the overall volatile organic compounds (VOCs) emitted in the workplace are reduced. Additionally, because carbohydrates are relatively inexpensive, the insulation product can be manufactured at a lower cost. Further, fibrous insulation product made using the inventive bio-based binder system has low to no odor, making it more desirable to work with. In particular, fibrous insulation product made using the inventive bio-based binder system has an improved odor profile than comparable bio-based binder systems containing higher levels of sulfur. Finally, the use of a blown, stripped plant-based oil as a dedusting agent reduced the risk of fire and explosions during the manufacture of the fibrous insulation product compared to the risk of fire and explosions during the manufacture of fibrous insulation products using dedusting agents made from petroleum-based products.

Having generally described this invention, a further understanding can be obtained by reference to certain specific examples illustrated below which are provided for purposes of illustration only and are not intended to be all inclusive or limiting unless otherwise specified.

EXAMPLES

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Example 1 Blowing Corn Stillage Oil

Into a 6000 gallon steel tank equipped with an air sparge distributor, positive displacement blower, regenerative thermal oxidizer(RTO) system, controlled heat source(whether it be external steam or hot oil jacket), and cooling coils, 45,000 pounds of corn stillage oil, similar to the corn stillage oil described in PCT Publication WO 2010/135637, published Nov. 25, 2010 (entitled "Blown Corn Stillage Oil") is charged. Air is sparged through the oil as it is heated. The air is sparged through the oil at a rate that maximizes the rate while at the same time causes a relatively even distribution of air bubbles within the oil. The rate of sparging is set so the reactor remains under a slight vacuum which indicates the RTO system can remove VOCs adequately and safely as they are produced from the reaction. The speed with which viscosity increases is directly proportional to the rate at which air is being blown into the corn stillage oil, and indirectly proportional to the size of the air bubbles. The smaller the air bubbles, the more surface area the faster the reaction. The oil within the reactor is tested periodically to determine the viscosity at 40° C. of the blown oil. When the desired viscosity is obtained, the air sparging is stopped and the reactor is allowed to cool. Air is sparged through the sample for the time indicated in Table 4. The properties of the resulting blown oil (Sample No. 1-4) is set forth in Table 4.

Example 1a Blowing Corn Stillage Oil and Soybean Oil Blends

Into a 6000 gallon steel tank equipped with an air sparge distributor, positive displacement blower, regenerative thermal oxidizer(RTO) system, controlled heat source(whether it be external steam or hot oil jacket), and cooling coils, 45,000 pounds of corn stillage oil and soybean oil blend, as indicated in Table 4 is charged. The corn stillage oil is similar to the corn stillage oil described in PCT Publication WO 2010/135637, published Nov. 25, 2010. The soybean oil is refined, bleached, and deodorized (RBD) soybean oil having an acid value of less than 0.5 mg KOH/gram. Air is sparged through the oil blend as it is heated to the temperature indicated in Table 4. The air is sparged through the oil blend at a rate that maximizes the rate while at the same time causes a relatively even distribution of air bubbles within the oil. The rate of sparging is set so the reactor remains under a slight vacuum which indicates the RTO system can remove VOCs adequately and safely as they are produced from the reaction. The rate with which viscosity increases is directly proportional to the rate at which air is being blown into the corn stillage oil, and indirectly proportional to the size of the air bubbles. The smaller the air bubbles, the more surface area the faster the reaction. The oil within the reactor is tested periodically to determine the viscosity at 40° C. of the blown oil. When the desired viscosity is obtained, the air sparging is stopped and the reactor is allowed to cool. Air is sparged through each of the samples for the times indicated in Table 4.

The properties of the resulting blown oil blends (Sample Nos. 1-1 through 1-3) are set forth below in Table 4.

TABLE 4

Properties of Blown Corn Stillage Oil and Soybean Oil Blend

| Sample No. | 1-1 | 1-2 | 1-3 | 1-4 |
|---|---|---|---|---|
| Corn Stillage Oil: soybean oil ratio | 2:3 | 2:1 | 4:1 | 1:0 |
| Sparging Temperature (° C.) | 115 | 115 | 115 | 115 |
| Sparging Time (hours) | 51 | 44 | 42 | 42 |
| Viscosity@40° C. (cSt) | 200 | 237 | 192 | 210 |
| Acid Value (mg KOH/gram) | 8 | 14 | 17 | 18 |
| Free Fatty Acid (wt %) | 4 | 7 | 8.5 | 9 |
| Gardner Color | 7 | 7 | 7 | 7 |
| Hydroxyl number (mg KOH/gram) | 28 | 52 | 30 | 55 |

As can be seen from Table 4, varying the weight ratio of corn stillage oil to soybean oil results in blown oil blends having varying properties, such as viscosity, for an approximately equal blowing time. Also, it can be seen from Table 4 that oil blends having higher corn stillage oil to soybean oil ratios (i.e. higher relative percentage of corn stillage oil) will take a shorter blowing time period to reach a given viscosity (or alternatively will reach a higher viscosity during the same time period) than blends having lower relative percentages of corn stillage oil.

Example 2 Stripping Blown Corn Stillage Oil

Into a 6000 gallon stainless steel reactor equipped with a mechanical agitator, a nitrogen sparge distributor, vacuum pump, regenerative thermal oxidizer(RTO) system, controlled heat source(hot oil jacket), and cooling coils, 45,000 pounds of blown corn stillage oil from Example 1, as indicated in Table 5, is charged. Nitrogen is sparged at about 5-10 CFM through the oil as it is heated to about 235° C. to 245° C. Once the oil reaches the desired temperature, shut off nitrogen sparge and apply full vacuum to the reactor (preferred pressure of 20 torr or less). The oil within the reactor is tested periodically to determine the viscosity at 40° C., flash point, and the acid value of the oil. When the oil reaches acid value of from 7-9 mg KOH/gram, break the vacuum to atmospheric pressure. Add desired amount of USP grade glycerol (which has lower than 0.3 weight percent impurities and less than or equal to 10 PPM Chloride ion (Cl⁻)) to the oil in the reactor and continue nitrogen sparging at while maintaining the temperature 235° C.-245° C. at atmospheric pressure until acid value is less than 5.0 and preferably less than 3.5 mg KOH/gram. When the desired viscosity, flash point, and acid value are obtained, cool the reactor. The oil samples are reacted for the times indicated in Table 5. The properties of the resulting stripped oils are set forth in Table 5.

TABLE 5

Properties of Stripped Blown Corn Stillage Oil

| Sample No: | 2-1 | 2-2 | 2-3 |
|---|---|---|---|
| Blown corn stillage oil used | Sample 1-4 | Sample 1-4 | Sample 1-4 |
| Glycerol Addition(% wt) | 0 | 0.15 | 1.2 |
| Glycerol Hydroxyl number (mg KOH/gram) | N/A | 1800 | 1800 |
| Reaction time (hours) | 36 | 27 | 20 |
| Final Acid Value (mg KOH/gram) | 3.6 | 2.7 | 2.2 |
| Hydroxyl number (mg KOH/gram) | 29 | 19 | 37 |
| Molar Ratio of OH— added/fatty acid group present before addition | N/A | 0.77:1 | 1.8:1 |

TABLE 5-continued

Properties of Stripped Blown Corn Stillage Oil

| Sample No: | 2-1 | 2-2 | 2-3 |
|---|---|---|---|
| Flash Point by Cleveland Open Cup Method ° C. | 315 | 326 | 316 |
| Viscosity @ 40° C. (cSt) | 580 | 465 | 531 |
| GPC Data (relative wt %) | | | |
| Mn | 1938 | 1876 | |
| Total FA + FAME (wt % Fatty Acid/ Fatty Acid Methyl Ester) | 0.73 | 0.87 | 1.9 |
| Diglyceride | 8.41 | 10.68 | 15.22 |
| Monomer | 24.03 | 23.14 | 21.13 |
| Dimer | 17.34 | 15.63 | 17.06 |
| Trimer | 8.37 | 7.68 | 8.48 |
| Tetramer + | 41.11 | 42 | 35.83 |

As can be seen from Table 5, varying the amount of polyol added to the corn stillage oil during stripping results in varying batch times. The more glycerol (a polyol) used, the shorter the batch time. As can be seen from Samples 2-2 and 2-3, the addition of polyol in small amounts and low molar ratios of OH– groups added to fatty acid groups present in the oil does provide blown, stripped corn stillage oils having a higher flash point due to the lower acid value versus Sample 2-1 where no polyol (glycerol) is added. In general, a lower acid value equates to a higher flash point. However, as becomes apparent when comparing the GPC analysis of Sample 2-3 to Samples 2.1 and 2.2, using more polyol induces more random interesterification which creates more small, undesirable molecules like diglycerides. This action also breaks up some of the desirable high molecular weight molecules like tetramers and larger. As can be seen from this Example, the molar ratio of OH-groups added to fatty acid present in the oil before addition (just prior to addition of glycerol) preferably is from is from 1:5 to less than 1:1, preferably from 1:4 to 9:10, more preferably from 2:5 to 4:5, and further more preferably from 1:2 to 4:5, when it is desirable to maximize the molecular weight of the resulting blown, stripped oil and to minimize the hydroxyl number of the resulting blown, stripped oil.

Example 3: Stripping the Blown, Stripped Oil Blend

Into a 6000 gallon stainless steel reactor (equipped with a mechanical agitator, a nitrogen sparge distributor, vacuum pump, regenerative thermal oxidizer(RTO) system, controlled heat source(hot oil jacket), cooling coils, and an overhead surface condenser), 45,000 pounds of blown corn stillage and soybean oil from example 2, as indicated by the ratios in Table 6, is charged. Nitrogen is sparged at about 5-10 CFM through the oil as it is heated to a temperature of from 235° C. to 245° C. Once the oil reaches the desired temperature, shut off nitrogen sparge and apply full vacuum to the reactor to the lower the pressure to 20 torr or less as measured on the vapor duct between the reactor and surface condenser. The oil within the reactor is tested periodically to determine the viscosity at 40° C., flash point, and the acid value of the oil. When the oil reaches acid value 7-9 mg KOH/gram, break the vacuum to atmospheric pressure. Add desired amount of glycerol to the oil in the reactor and continue to sparge with nitrogen to strip the reactor while maintaining the oil at 235° C. to 245° C. and atmospheric pressure until acid value is less than 5.0 and preferably less than 3.5 mg KOH/gram. When the desired viscosity, flash point, and acid value are obtained, cool the reactor. The oil samples are reacted for the times indicated in Table 6. The properties of the resulting stripped oils are set forth in Table 6.

TABLE 6

Properties of Blown, Stripped Corn Stillage and Soybean Oil Blend

| | Sample No. | | | | | |
|---|---|---|---|---|---|---|
| | 3-1 | 3-2 | 3-3 | 3-4 | 3-5 | 3-6 |
| Sample No. of blown, oil blend utilized | 1-1 | * | 1-2 | 1-3 | 1-3 | ** |
| Polyol Added (% wt) | 0 | 1.2% | 0 | 0 | 0.15% | 0 |
| Molar ratio of OH-groups added to fatty acids present | N/A | 1.8:1 | N/A | N/A | 0.77:1 | N/A |
| Glycerol Hydroxyl number (mg KOH/gram) | N/A | 1800 | N/A | N/A | 1800 | N/A |
| Reaction time (hours) | 27 | 20 | 29 | 40 | 27 | 27 |
| Acid Value (mg KOH/gram) | 3.5 | 2.2 | 3.0 | 3.9 | 2.7 | 3.5 |
| Hydroxyl number (mg KOH/gram) | 34 | 37 | 30 | | 19 | 38 |
| Flash Point COC ° C. | 313 | 316 | 305 | 306 | 326 | 320 |
| Viscosity @ 40° C. (cSt) | 521 | 531 | 550 | 512 | 465 | 528 |

* The blown oil blend utilized to make Sample No. 3-2 is made by a procedure similar to the procedure of Example 1a. The corn stillage oil to soybean ratio of the blend is 2:3. The blown oil blend had a viscosity of about 200 cSt @ 40° C., an acid value of 8 mg KOH/gram, a free fatty acid content of 4 wt %, a Gardner color of 7, and a hydroxyl number of about 30 mg KOH/gram.
** The blown oil blend utilized to make Sample No. 3-6 is made by a procedure similar to the procedure used to make Sample 1-2. However, the blown oil blend had a viscosity of about 200 cSt @ 40° C., an acid value of 14 mg KOH/gram, a Gardner color of 7, and a hydroxyl number of about 38 mg KOH/gram.

Example 4: Making the Dedust Composition

The blown, stripped oil blend of Sample 3-6 is blended with 10 percent by weight refined, bleached, and deodorized sunflower oil having an iodine value of 88 to 115 mg KOH/gram and 18:3 fatty acid profile of less than 1% by weight to produce a blown, stripped, plant-based oil Sample 3-7. Sample 3-7 has 6 ppm sulfur and a viscosity of 370 cSt@40° C. An amount of a first Emulsifying Agent indicated in Table 7 is mixed with the blown, stripped plant-based oil Sample 3-7 as indicated in Table 7. An amount of a second emulsifying agent is mixed with water as indicated in Table 7. Water containing the second emulsifying agent (as indicated in Table 7) is mixed with the oil (as indicated in Table 7) to produce the dedust compositions of Table 7.

TABLE 7

Dedust Composition

| Dedust Composition | Sample 4-1 | Comparative Sample 4-2 |
|---|---|---|
| Blown, Stripped Plant-Based Oil Sample | Sample 3-7 | Sample 3-7 |
| First Emulsifying agent | Chemax EMX 1154: a non-ionic surfactant available from PCC Chemex, Inc. | Lignosulfonate |
| Sulfur (ppm) in the First Emulsifying Agent | Less than 1 ppm | 5,000 ppm |
| Weight percent First Emulsifying agent add to Sample 3-6 | 1.0 wt % | 5 weight percent based on the weight of dedust oil (*but it is not premixed with the oil prior to emulsion formation) |

TABLE 7-continued

Dedust Composition

| Dedust Composition | Sample 4-1 | Comparative Sample 4-2 |
|---|---|---|
| Second Emulsifying agent | Cekol 20,000: a carboxymethylcellulose material available from CP Kelco, Inc. | N/A |
| Sulfur (ppm) in the Second Emulsifying agent | Less than 1 ppm | N/A |
| Weight percent Second Emulsifying Agent in aqueous solution | 0.2 wt % | N/A |
| Weight ratio oil to Aqueous phase in Emulsion | 50:50 | 50:50 |
| Sulfur (ppm) in dedust composition Samples (i.e. oil-in-water emulsion) | 3 ppm | 128 ppm |
| Sulfur (ppm) in the dedust composition Samples, excluding water | 6 ppm | 256 ppm |

Example 5: Odor Profile of Fiberglass Insulation

Two sets of R-19 to R-20 fiberglass insulation batts are manufactured in a conventional manner known to one of ordinary skill in the art. All the fiberglass batts are manufactured with a target LOI of 6.0+0.5.

The first set of batts are manufactured utilizing a bio-based binder system of the current invention where the aqueous binder composition comprise a 70:30 weight ratio of a maltodextrin to citric acid. The maltodextrin has a Dextrose Equivalent number of 11.0 (DE 11.0) and is available from Cargill, Incorporated. For this first set of batts, the dedust composition utilized is the dedust composition of Sample 4-1. The amount of dedust composition utilized in the manufacture of this first set of fiberglass batts varies from 0.375 to 0.75 percent by weight based on the weight of the cured fiberglass insulation. Additionally, about thirteen percent (13%) by weight of a gamma-aminopropyl-trihydroxy-silane coupling agent and five percent (5%) by weight of Sodium Hypophosphite accelerant based on the weight of the binder composition, silane, and accelerant are utilized during the manufacture of the fiberglass batts. The extent of curing (high, medium, and low cure) is varied during the manufacture of the fiberglass batts of this first set. The first set of batts all had less than 0.5 ppm sulfur content based on the weight of the batts, typically less than 0.1 ppm sulfur content based on the weight of the batts, and even some less than 0.05 ppm sulfur content based on the weight of the batts.

A second set of batts are manufactured utilizing a bio-based binder system comparable to the binder described for the first set of batts, except that a dedust composition as set forth for Comparative Sample 4-2 is utilized. For this second set of batts, the amount of dedust composition utilized in the manufacture of is varied from 0.375 to 0.75 percent by weight based on the weight of the cured fiberglass insulation. Similar level of silane and accelerant are utilized for this second set of batts as described for the first set of batts. The extent of curing (high, medium, and low cure) is varied during the manufacture of the fiberglass batts of this second set.

Odor Analysis

Eight by Eight inch squares are cut from the fiberglass insulation batts of the first and second sets, placed in zip bags, and sealed. Odor panelists were provided with a fresh sample bag and the panelists individually ranked each of the samples from strongest aroma (higher number) to weakest aroma (lower number). The results from the odor panels are tabulated. The results of the odor panels show that the insulation batts from the first set of fiberglass insulation (i.e. the batts made utilizing the bio-based binder system of the current invention) exhibit equivalent or better odor profiles (i.e. lower objectionable odor) than the comparable batts from the second set of fiberglass insulation batts. The batts from the first set performed especially well compared to the second set when the batts are manufactured with relatively higher extent of curing. This example shows that fibrous insulation products, such as fiberglass insulation batts made utilizing the current bio-based binder system, exhibit enhanced properties over comparable binder systems having higher sulfur levels.

What is claimed is:

1. A bio-based binder system useful for the formation of rotary fiber insulation (for example fiberglass insulation), the system comprising:
    A) an aqueous curable binder composition comprising:
        (i) at least one carbohydrate;
        (ii) at least one crosslinking agent; and
    B) a dedust composition comprising:
        (i) a blown, stripped plant-based oil having a viscosity of at least 200 cSt at 40° C., a flash point of at least 293° C., and having an acid value less than 5.0 mg KOH/gram,
    wherein dedust composition B) comprises an oil-in-water emulsion, wherein a first emulsifier component is mixed into the blown, stripped plant-based oil of (i) and a second emulsifying component comprising carboxymethyl cellulose is mixed into an aqueous solution before the oil-in-water emulsion is formed by mixing the aqueous solution containing the second emulsifying component and the blown, stripped plant-based oil containing the first emulsifier component, and the first emulsifier component is selected from the group consisting of an alkoxylated fatty acid, a primary amine-based emulsifier, a secondary amine-based emulsifier, a tertiary amine-based emulsifier, and mixtures thereof; and
    wherein the bio-based binder system comprises 10 part per million sulfur or less based on the weight of components A) and B), excluding water.

2. The bio-based binder system of claim 1, wherein the emulsifier component comprises an alkoxylated fatty acid.

3. The binder system of claim 1, wherein the dedust composition has less than 100 part per million sulfur, based on the weight of component B), excluding water.

4. The binder system of claim 3, wherein the dedust composition has less than 40 part per million sulfur, based on the weight of component B), excluding water.

5. The binder system of claim 4, wherein dedust composition has less than 20 part per million sulfur, based on the weight of component B), excluding water.

6. The binder composition of claim 5, wherein the dedust composition has less than 10 part per million sulfur, based on the weight of component B)).

7. The bio-based binder system of claim 1, wherein the first emulsifier component comprises a primary amine-based emulsifier.

8. The binder composition of claim 1, wherein the first emulsifying component comprises a secondary amine-based emulsifier.

9. The binder system of claim 1, wherein the binder system comprises 5 part per million sulfur or less based on the weight of components A) and B), excluding water.

10. The curable binder system of claim 1, wherein the blown, stripped plant-based oil has a viscosity of at least 250 cSt at 40° C.

11. The binder system of claim 1, wherein the blown, stripped plant-based oil has an acid value less than 4.0 mg KOH/gram.

12. The binder system of claim 1, wherein the blown, stripped plant-based oil comprises a blown, stripped, bodied plant-based oil.

13. The binder system of claim 1, wherein the blown, stripped plant-based oil is made from a blend of corn stillage oil and soybean oil in a weight ratio of corn stillage oil to soybean oil of from 5:95 to 95:5.

14. The binder composition of claim 1, wherein the first emulsifying component comprises a tertiary amine-based emulsifier.

15. The binder system of claim 1, wherein the blown, stripped plant-based oil has an hydroxyl number from about 1 mg KOH/gram to about 50 mg KOH/gram.

16. The binder system of claim 1, wherein the blown, stripped plant-based oil has less than 50 ppm sulfur.

17. The binder system of claim 1, wherein the weight ratio of binder composition A) to dedust composition B) is from about 100:1 to 100:34.

* * * * *